US010253155B2

(12) United States Patent
Bocchini et al.

(10) Patent No.: US 10,253,155 B2
(45) Date of Patent: *Apr. 9, 2019

(54) METHOD FOR THE PREPARATION OF POLYANILINE/REDUCED GRAPHENE OXIDE COMPOSITES

(71) Applicant: FONDAZIONE ISTITUTO ITALIANO DI TECNOLOGIA, Genoa (IT)

(72) Inventors: Sergio Bocchini, Borgo San Dalmazzo (IT); Alessandro Chiolerio, Turin (IT); Samuele Porro, Pianezza (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 19 days.

This patent is subject to a terminal disclaimer.

(21) Appl. No.: 15/521,328

(22) PCT Filed: Oct. 29, 2015

(86) PCT No.: PCT/IB2015/058356
§ 371 (c)(1),
(2) Date: Apr. 24, 2017

(87) PCT Pub. No.: WO2016/067243
PCT Pub. Date: May 6, 2016

(65) Prior Publication Data
US 2017/0306127 A1  Oct. 26, 2017

(30) Foreign Application Priority Data
Oct. 29, 2014  (IT) .............................. TO2014A0882

(51) Int. Cl.
*H01B 1/08*  (2006.01)
*C08K 3/04*  (2006.01)
(Continued)

(52) U.S. Cl.
CPC ............ *C08K 3/042* (2017.05); *C01B 32/182* (2017.08); *C08G 73/0266* (2013.01);
(Continued)

(58) Field of Classification Search
CPC .............. C01B 32/182; C08G 73/0266; C08K 2201/001; C08K 3/042; C09D 11/322;
(Continued)

(56) References Cited

U.S. PATENT DOCUMENTS

2014/0087192 A1  3/2014  Lai et al.
2017/0051167 A1  2/2017  Bocchini et al.

FOREIGN PATENT DOCUMENTS

CN    102350372 A       2/2012
CN    104211960 A   *  12/2014
(Continued)

OTHER PUBLICATIONS

Fan et al, "Preparation of graphene/polyaniline conducting composite by graphene oxide for oxidant," Fuhe Cailiao Xuebao, 30, 1, pp. 27-31 (2013) (Abstract only). (Year: 2013).*
(Continued)

*Primary Examiner* — Mark Kopec
*Assistant Examiner* — Jaison P Thomas
(74) *Attorney, Agent, or Firm* — Marshall, Gerstein & Borun LLP

(57) ABSTRACT

The present invention concerns a method for obtaining polyaniline/reduced graphene oxide composites comprising the steps of dispersing the graphene oxide in an acid aqueous solution containing an emulsifying agent to obtain a graphene oxide dispersion; dissolving one or more aniline oligomers in an organic solvent to obtain an oligomer solution; mixing the oligomer solution with the graphene oxide dispersion, said oligomer being added in a stoichiometric excess compared to the quantity required to complete
(Continued)

the graphene oxide reduction; adding to the suspension of the polyaniline/reduced graphene oxide composite an oxidizing agent in a stoichiometric quantity compared to said excess of oligomer so as to oxidize the excess of said oligomer to obtain a suspension of the polyaniline/reduced graphene oxide composite.

11 Claims, 10 Drawing Sheets

(51) Int. Cl.
    *C09D 11/322*     (2014.01)
    *C09D 11/52*     (2014.01)
    *C08G 73/02*     (2006.01)
    *H01G 11/32*     (2013.01)
    *H01G 11/86*     (2013.01)
    *H01B 1/12*     (2006.01)
    *C01B 32/182*     (2017.01)

(52) U.S. Cl.
    CPC ............ *C09D 11/322* (2013.01); *C09D 11/52* (2013.01); *H01B 1/08* (2013.01); *H01B 1/128* (2013.01); *H01G 11/32* (2013.01); *H01G 11/86* (2013.01); *C08K 2201/001* (2013.01); *Y02E 60/13* (2013.01)

(58) Field of Classification Search
    CPC .......... C09D 11/52; H01B 1/08; H01B 1/128; H01G 11/32; H01G 11/86; Y02E 60/13
    See application file for complete search history.

(56) References Cited

FOREIGN PATENT DOCUMENTS

| | | |
|---|---|---|
| IT | TO2013A000561 | 8/2014 |
| WO | WO-2015/001534 A1 | 1/2015 |

OTHER PUBLICATIONS

Angelopoulos, Conducting polymers in microelectronics, IBM J. Res. Development, 45(1):57-75 (2001).
Bhadra et al., Progress in preparation, processing and applications of polyaniline, Prog. Polym. Sci., 34(8):783-810 (2009).
Bocchini et al., Synthesis of polyaniline-based inks, doping thereof and test device printing towards electronic applications, J. Mater. Chem. C, 1:5101-9 (2013).
Chen et al., White-light emission from an upconverted emission with an organic triplet sensitizer, Chem. Commun. (Camb.), 21(27):4064-6 (2009).
Cholerio et al., Inkjet Printed Negative Supercapacitors: Synthesis of Polyaniline-Based Inks, Doping Agent Effect, and Advanced Electronic Devices Applications, Adv. Func. Mater., 24(22):3375-83 (2014).
Di Ventra et al., Circuit elements with memory: memristors, memcapacitors and meminductors, Proceedings of the IEEE 97, 1717 (2009).
Geim et al., The rise of graphene, Nat. Mater., 6(3):183-91 (2007).
Gospodinova et al., Conducting polymers prepared by oxidative polymerization: polyanilene, Prog. Polym. Sci., 23:1443-84 (1998).
Hill et al., Dielectric function and plasmons in graphene, EPL (Europhysics Letters), 87(2):27005 (2009).
International Preliminary Report on Patentability, International Application No. PCT/IB2015/058356, dated May 2, 2017.
International Search Report and Written Opinion, International Application No. PCT/IB2015/058356, dated Apr. 11, 2016.
Jamróz et al., Hydration of sulfonated polyimide membranes. II. Water uptake and hydration mechanisms of protonated homopolymer and block copolymers, J. Phys. Chem. B, 109(42):19664-75 (2005).
Kang et al., Polyaniline: A polymer with many interesting intrinsic redox states, Prog. Polym. Sci., 23(2):277-324 (1998).
Katnelson et al., Graphene: New bridge between condensed matter physics and quantum electrodynamics, Solid State Communications, 143(1-2):3-13 (2007).
Kochowski et al., Description of the frequency behaviour of metal-SiO2—GaAs structure characteristics by electrical equivalent circuit with constant phase element, Thin Solid Films, 415(1-2):133-7 (2002).
Lee et al., Hybrid multilayer thin film supercapacitor of graphene nanosheets with polyaniline: importance of establishing intimate electronic contact through nanoscale blending , J. Mater. Chem., 22:21092-9 (2012).
Lee et al., Preparation and characterization of core-shell polyaniline-polystyrene sulfonate@Fe3O4 nanoparticles, Mater. Chem. Phys., 112:805-9 (2008).
Lu, Memristors: Going active, Nat. Mater., 1292):93-4 (2013).
MacDiarmid, "Synthetic Metals": A Novel Role for Organic Polymers (Nobel Lecture) , Angew. Chem. Int. Ed. , 40:2581-90 (2001).
Mayo et al., Course Notes on the Interpretation of Infrared and Raman Spectra, Hoboken, NJ: John Wiley & Sons (1998).
Meng et al., Hierarchical Porous Graphene/Polyaniline Composite Film with Superior Rate Performance for Flexible Supercapacitors, Adv. Mater., 25(48):6985-90 (2013).
Monguzzi et al., Upconversion-induced delayed fluorescence in multicomponent organic systems: Role of Dexter energy transfer, Phys. Rev. B, 77:155122 (2008).
Novoselov et al., Electric field effect in atomically thin carbon films, Science, 306(5696):666-9 (2004).
Pershin et al., Memory effects in complex materials and nanoscale systems, Adv. Physics, 60:145-227(2011).
Pickett et al., A scalable neuristor built with Mott memristors, Nat. Mater., 12(2):114-7 (2013).
Plonska-Brzezinska et al., The electrochemical properties of nanocomposite films obtained by chemical in situ polymerization of aniline and carbon nanostructures, Chemphyschem., 14(1):116-24 (2013).
Reineke et al., White organic light-emitting diodes with fluorescent tube efficiency, Nature, 459(7244):234-8 (2009).
Rourke et al., The real graphene oxide revealed: stripping the oxidative debris from the graphene-like sheets, Angew. Chem. Int. Ed. Engl., 50(14):3173-7 (2011).
Schoch et al., Update on electrically conductive polymers and their applications, IEEE Electrical Insulation Magazine, 10(3):29-32 (1994).
Shim et al., Electrochemistry of conductive polymers VII. Autocatalytic rate constant for polyaniline growth, Synthetic Metals, 29(1):169-74 (1989).
Silverstein et al., Spectrometric Identification of Organic Compounds, Chapter 3, 6th edition, New York: John Wiley & Sons (1998).
Tang et al., Infrared spectra of soluble polyaniline, Synthetic Metals, 24(3):231-8 (1988).
Unsworth et al., Technical review: Conducting polymer electronics, J. Intell. Mat. Systems Structures, 3(3):380-95 (1992).
Wei et al., Properties of graphene inks stabilized by different functional groups, Nanotechnology, 22(24):245702 (2011).
Xia et al., Camphorsulfonic Acid Fully Doped Polyaniline Emeraldine Salt: Conformations in Different Solvents Studied by an Ultraviolet/Visible/Near-Infrared Spectroscopic Method, Chem. Mater., 7(3):443-5 (1995).
Xu, Reduction of Graphene Oxide by Aniline with Its Concomitant Oxidative Polymerization, Macromolecular Rapid Commun., 32(8):684-8 (2011).
Zhu et al., Carbon nanostructure-derived polyaniline metacomposites: electrical, dielectric, and giant magnetoresistive properties, Langmuir, 28(27):10246-55 (2012).

\* cited by examiner

METHOD FOR THE PREPARATION OF POLYANILINE/REDUCED GRAPHENE OXIDE COMPOSITES

CROSS-REFERENCE TO RELATED APPLICATIONS

This is the U.S. national phase of International Application No. PCT/IB2015/058356, filed Oct. 29, 2015, which claims the benefit of Italian Patent Application No. TO2014A000882, filed Oct. 29, 2014.

TECHNICAL FIELD

The present invention concerns a method for obtaining polyaniline/reduced graphene oxide composites. In particular, said composites are used as conductive inks and in other electrical and electronic applications such as: thermoelectrical, electrochemical, electromagnetic, electromechanical, electro-luminescent, electro-rheological and chemical applications, and for the production of membranes and sensors.

BACKGROUND ART

The intrinsically conductive polymers (ICPs) owe their electrical conductivity to the presence of a $\pi$ electronic system of conjugated type in their structure[1-3]. Polyaniline (PANI) is an ICP which shows relatively low conductivity values compared to other ICPs such as doped polyacetylene or polyphenylene, but has the advantage of presenting high stability and workability[4]. Due to its easy preparation, good ambient stability, interesting redox properties and potential for applications in electronic and optical devices[5], polyaniline has become one of the most important conductive polymers and has been intensely studied over the last two decades[6-7]. In a recent study[8] it was demonstrated that polyaniline can be used for the synthesis of functional inks which can be used for digital printing and deposited as thin films on flexible polymer substrates; polyaniline also shows particular electronic properties, such as negative overcapacity in the low frequency range. The particular trend of the charge vs. DC voltage diagram, in a "butterfly" form, is clear evidence of the underlying memristive, or better "memcapacitive" properties, as suggested in Di Ventra et al.[9]. Promising memristive properties have been found in devices produced with nanocomposites of PANI-graphene[10], which provide the base for future application in neuromorphic systems[11-12].

Although ten years have elapsed since its discovery[13], two-dimensional graphene with honeycomb lattice continues to arouse great interest due to the non-conventional phenomena associated with this material, mainly originating from the fact that the electrons belonging to the carbon atoms are obliged to move in the plane defined by the graphene sheet according to paths with hexagonal symmetry, a fact which makes them similar to massless particles[14]. The introduction of graphene in PANI matrices to form nanocomposite structures of PANI/graphene has led to an improvement in the electronic characteristics of the ICP and also to interesting new electronic effects. In particular, in accordance with the quanto-relativistic effects in the scattering of electrons due to short-radius disturbance potentials such as those introduced by charged groups into the adjacent ICP matrix, the massless Dirac fermions which interfere with small scattering centres make a negligible contribution to the overall resistivity. Only in the case of resonant scattering can it be found that the contribution to the resistivity is equal to that of a non-relativistic electron gas[15].

Due to the presence of oxygen functions on the basal planes and on the edges, which make them very hydrophilic, graphene oxide sheets (GO) are often preferred to graphene in the formulation of polymer composites, since in water they swell up and are easily dispersed[16].

Furthermore, it has been recognised for some time that GO has strong oxidising properties[17] and it has therefore been used in the one-pot synthesis of PANI/graphene composites, coupling the GO reduction process with the oxidative polymerisation process of the aniline precursor[18]. However, this process has a limiting phase consisting in dimerization of the aniline precursor[19].

A known method of synthesising PANI/reduced graphene oxide composites uses a process in which a dispersion of graphene oxide in the presence of an anionic emulsifying agent is mixed with a solution of an aniline oligomer in an organic solvent.

However, the composite obtained has the drawback of resulting only in a well-defined and limited quantity of PANI formed in a stoichiometric ratio with respect to the reduction of graphene oxide.

The need is therefore felt in the art for an alternative method for the preparation of polyaniline and reduced graphene oxide composites starting from low toxicity reagents, which is conducted in an aqueous medium, which is quicker and simpler than the known methods, which provides a highly regular product and allows the preparation of stable reduced graphene polyaniline solutions with polyaniline/reduced graphene oxide ratio that can be varied as required for applications such as flexible electronics obtained by inkjet printing, and improved properties for application in electronic devices.

DISCLOSURE OF INVENTION

The object of the present invention is therefore to provide a new preparation method which is free from the drawbacks of the methods described above.

Said object is achieved by the present invention, since it relates to a method for the preparation of polyaniline and reduced graphene oxide composites according to claim 1 and the use of said composite.

BRIEF DESCRIPTION OF THE DRAWINGS

The present invention will now be described in detail with reference to the Figures of the attached drawings, in which.

BEST MODE FOR CARRYING OUT THE INVENTION

Figure 1:
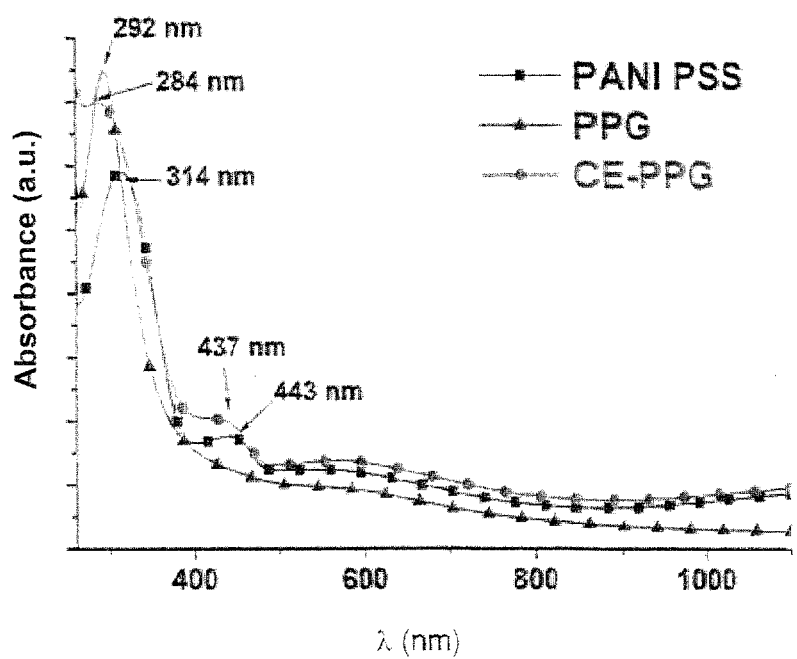
FIG. 1 illustrates the UV-vis absorption spectra of the PANI-PSS, PPG and CE-PPG composites.

According to a first aspect of the invention a method is provided for obtaining polyaniline and reduced graphene oxide composites comprising the steps of:

dispersing the graphene oxide in an acid aqueous solution containing an emulsifying agent to obtain a dispersion of graphene oxide;

dissolving one or more oligomers of the aniline in an organic solvent to obtain an oligomer solution;

mixing the oligomer solution with the dispersion of graphene oxide, said oligomer being added in stoichiometric excess with respect to the quantity required for completing the reduction of the graphene oxide;

adding to the suspension of the polyaniline and reduced graphene oxide composite an oxidising agent in stoichiometric quantity with respect to said excess of oligomer so as to oxidise said oligomer excess to obtain a polyaniline and reduced graphene oxide composite.

Advantageously, the present method allows a composite to be obtained containing polyaniline chains having greater regularity since starting from the oligomer reduces the statistical probability of ramification in the ortho position of the aniline which is also reduced by the steric effects; the product thus obtained due to the presence of the emulsifier which separates the reduced graphene oxide (rGO) sheets and bonds the polyaniline to the graphene forms stable solutions also in organic solvents such as DMSO thereby simplifying the end use as ink in inkjet printing techniques.

Unlike the methods that make use of aniline as a starting monomer, the polymerisation starting from oligomers, preferably dimers, does not entail the use of toxic reagents, making the reaction easier to perform. Lastly the use of oligomers allows the reduced graphene oxide concentration in the end composite to be modulated, so that the use thereof can be limited to the quantity strictly necessary, thereby permitting variation of the conductivity (which decreases as the quantity of graphene decreases) of the compound according to the type of application required.

The use of an excess of oligomer which is subsequently oxidised by an oxidising agent allows the preparation of a composite containing an even greater quantity of polymer with respect to the composites of the known art, thus significantly improving the resonance scattering effects.

In this text "oligomer" means a compound resulting from the polymerisation of a finite and reduced number of monomer units, preferably from 2 to a maximum of 10 monomer units.

In one embodiment the oligomers of the aniline can if necessary be substituted in the ortho and meta positions to the nitrogen atom or on the nitrogen atom itself with a radical selected from the group consisting of methoxyl, ethoxyl, propyloxyl, methyl, ethyl, propyl, isopropyl, butyl, isobutyl, tertbutyl, pentyl, phenyl, sulfonyl, vinyl.

The use of an emulsifier overcomes the problem of solubilisation of the oligomers in aqueous solution forming a stable suspension.

In one embodiment, the aniline oligomer used is the dimer (N-phenyl-1,4-phenylenediamine) (DANI).

The oligomer is dissolved in an organic solvent preferably chosen from the group consisting of 1,2-butanediol, 1,3-butanediol, 1,3-propanediol, 1,4-butanediol, 1,4-dioxane, 1,5-pentanediol, 1-propanol, 2-butoxyethanol, 2-propanol, acetaldehyde, acetic acid, acetone, acetonitrile, butyric acid, diethanolamine, diethylenetriamine, dimethoxyethane, dimethylsulfoxide, N,N-dimethylformamide, ethanol, ethylamine, ethylene glycol, formic acid, furfuryl alcohol, glycerol, methanol, methyl diethanolamine, methyl isocyanide, propanoic acid, propylene glycol, pyridine, tetrahydrofuran, triethylene glycol, N-methylpyrrolidone, N,N-dimethylacetamide.

The graphene oxide is suspended in an acid aqueous solution containing the anionic emulsifier, for example chosen from the group consisting of sulfonates, phosphorylates and carboxylates, preferably chosen from the group consisting of poly(sodium 4-styrene sulfonate) (PSS), dodecylbenzenesulfonate (DBSA), methylbenzenesulfonate (MBSA), 2-amino-ethyl-phosphonate, polyacrylate, adipate, poly (2-acrylamido-3-methyl-1-propane sulfonate), dodecyl diphenyloxide disulfonate, N, N'-dimethyl (methacryloyl ethyl) ammonium propane sulfonate, 2-acrylamido-2-methyl-1-propane sulfonate, isophthalic 5-sulfonate. The acid aqueous solution is an aqueous solution of an acid selected from the group consisting of hydrochloric acid, nitric acid, sulphuric acid and phosphoric acid.

The method of the invention, despite the use of the aniline dimer, notoriously non-soluble in water, can be carried out in an aqueous environment due to the formation of a stable emulsion following the action of the emulsifier present in the graphene oxide solution.

During the polymerisation reaction, the graphene oxide acts as an oxidiser of the oligomer which polymerises to polyaniline, while the graphene oxide is reduced by the oligomer forming the reduced graphene.

The oligomer solution is added to the graphene oxide suspension in a quantity such that the oligomer contained in it is in stoichiometric excess with respect to the quantity required to complete the reduction of the graphene oxide.

Advantageously, the dimer proved to be a more effective reducing agent for the graphene oxide than the monomer aniline and therefore the reaction speed is higher, determining a complete reaction in the space of 1 hour at 80° C. against a reaction time of 24 hours at 70° C. in the case of use of the monomer aniline[21].

In one embodiment, after mixing the graphene oxide suspension with the oligomer solution, the reaction mixture was heated to a temperature between 40 and 90° C., preferably between 60 and 80° C., in particular for a time interval between 20 minutes and 6 hours, to promote and accelerate the polymerisation.

If a reduction in the reduced graphene oxide load is desired, the dianiline can be substituted with an oligomer with higher molecular weight.

The excess of oligomer, not oxidised by the graphene oxide, is subsequently oxidised with an oxidising agent, preferably an oxidising agent having an oxidisation potential greater than 0.1 volt, more preferably an oxidising agent selected from the group consisting of ammonium persulfate, salts of $Cu^{2+}$, $Cu^+$, $Fe^{3+}$, $Pd^{2+}$, $MnO_4^-$, $Sb^{+5}$, $Ag^+$, $Au^{3+}$, $Au^+$, $Pt^{2+}$, $Cr_2O_7^{2-}$, $Rh^{4+}$, $Ce^{4+}$, $Mn^{3+}$, $Co^{3+}$, $CrO_4^{2-}$, $S_2O_4^{-2}$, hydrogen peroxide and gaseous oxygen.

In one embodiment, the oxidising agent is ammonium persulfate.

Further characteristics of the present invention will become clear from the following description of some merely illustrative non-limiting examples.

The following abbreviations are used in the examples below: min (minutes), h (hours), µs (microseconds), g (grams), mg (milligrams), ml (milliliters), nm (nanometers), Da (Dalton), mmol (millimoles), M (molar), W (Watt), ° C. (degrees centigrade), Hz (Hertz), V (Volt), PANT (polyaniline), ICPs (intrinsically conductive polymers), DANI (dimer of aniline, N-phenyl-1,4-phenylenediamine), GO (graphene oxide), rGO (reduced graphene oxide), PSS (poly (sodium 4-styrene sulfonate)), DMSO (dimethylsulfoxide), STM (scanning tunnelling microscope), APS (ammonium persulfate), HCl (hydrochloric acid).

Example 1

Synthesis of the Polyaniline and Reduced Graphene Oxide Composite According to the Present Invention (CE-PPG)

The single layer graphene oxide in 300-800 nm sheets with thickness of 0.7-1.2 nm was purchased from Cheap-Tubes (Brattleboro, Vt., USA) and used in the state in which it was received. The aniline dimer (N-phenyl-1,4-phenylenediamine 98%), the poly(sodium 4-styrene sulfonate) (PSS, PM=70000 Da), the hydrochloric acid (HCl, 37% by weight), the dimethylsulfoxide (DMSO, 99.9%) and the ammonium persulfate (APS, 98%) were obtained from Sigma Aldrich (Milan, Italy) and used in the state in which they were received.

0.050 g of GO were added to 100 ml of a solution of PSS (0.500 g) in HCl 0.1 M. The dispersion was treated with an ultrasound probe for 1 h (50 W) so as to obtain a stable dispersion of GO. This was then diluted to 300 ml with a 0.1M solution of HCl.

0.411 g of PSS were then added.

A solution of DANI (4 mmol, 0.921 g) in 10 ml DMSO was prepared separately.

10 ml of this solution were added dropwise to the oligomer dispersion to obtain an emulsion of DANI. The solution was heated to 80° C. for 1 h to obtain complete reduction of the graphene oxide. During the heating a green precipitate formed. The solution was cooled to 25° C. and an excess of APS was added slowly (5 mmol, 1.141 g) previously dissolved in 100 ml of HCl 0.1 M to oxidise the excess of DANI.

After 4 hours, the precipitate was filtered and washed several times with distilled water until discolouration, then with methanol and lastly dried at 60° C. until a constant weight was obtained.

Example 2

Synthesis of the Polyaniline and Reduced Graphene Oxide Composite According to the Known Art (PPG)

As reference material, a polyaniline and reduced graphene oxide composite was prepared as illustrated in TO2013A000561.

0.100 g of GO were added to 100 ml of a PSS solution (1.000 g) in HCl 0.1 M. The dispersion was treated with an ultrasound probe for 1 h (50 W) so as to obtain a stable dispersion of GO.

A solution of DANI (4.34 mmol, 1.000 g) in 10 ml DMSO was prepared separately.

10 ml of this solution were added dropwise to the oligomer dispersion to obtain an emulsion of DANI. The solution was heated to 80° C. for 1 h to obtain complete reduction of the graphene oxide. During the heating a green precipitate formed following oxidisation of the DANI to form PANI. The precipitate was separated by centrifugation and washed several times with distilled water and ethanol. The final product (PPG), a green powder, was dried at 60° C. until obtaining a constant weight.

Example 3

Physical-Chemical Characterisation of the Composite Obtained According to the Invention (CE-PPG) and Comparison with the Composite of the Known Art (PPG)

The structure of the composites obtained in examples 1 and 2 was characterised to evaluate the reduction of GO and the concomitant oxidisation of DANI.

UV-Vis Spectrum

The UV-Vis absorption spectra were recorded in the wavelength range from 250 to 1100 nm at ambient temperature on solutions in DMSO using a UV-vis-NIR Cary 5000 spectrometer.

The UV-visible spectra of the composites in a DMSO solution are shown in FIG. 1, in which the acronym PANI-PSS indicates a polyaniline composite containing PSS as doping agent, PPG is a polyaniline and reduced graphene composite, doped with PSS, prepared as illustrated in example 2, and CE-PPG is the composite of the invention. As in many other solvents, the PANI-PSS composite adopts in DMSO a compact spiral conformation. In this case, the main bands observed are: the transition π-π* at approximately 314 nm partially overlapped with absorption of the PSS; the polaron-π* band at 443 nm for the protonated conductive PANI-PSS, which gives the solution its green colour; the absorption band at approximately 600-650 nm for the np transition, observed for the base emeraldine[21]. This latter band reveals that the PANI-PSS composite is not completely protonated, as scheduled for the PANI doped with a macromolecular agent without secondary doping.

The presence of relatively high quantities of graphene modifies the UV-vis spectra in the samples of PPG composite, in which the transition π-π* at 292 nm is still recognisable, but the absorbance of the graphene which overlaps the band shifts the maximum towards lower wave numbers. For the same reason, it is difficult to identify the polaron-π* band (approximately 440 nm), while the np transition derived from the emeraldine in the base form is only just recognisable.

On the other hand, the samples of the CE-PPG composite, which contain a higher quantity of PANI, show bands more similar to PANI-PSS, even if the presence of the graphene shifts the peak maximums. The π-π* transition is observed at 284 nm, the polaron-π* band around 437 nm and the np transition around 600-650 nm.

Infrared Spectrum

The spectra of the Fourier transform infrared spectroscopy (FT-IR) were collected with an FT-IR Nicolet 5700 (ThermoFisher) spectrometer.

The samples were prepared by deposition of a solution in DMSO on a silicon wafer. The measurement was taken from the mean of 64 spectra collected at a resolution of 2 $cm^{-1}$ from 4000 to 400 $cm^{-1}$.

Figure 8:
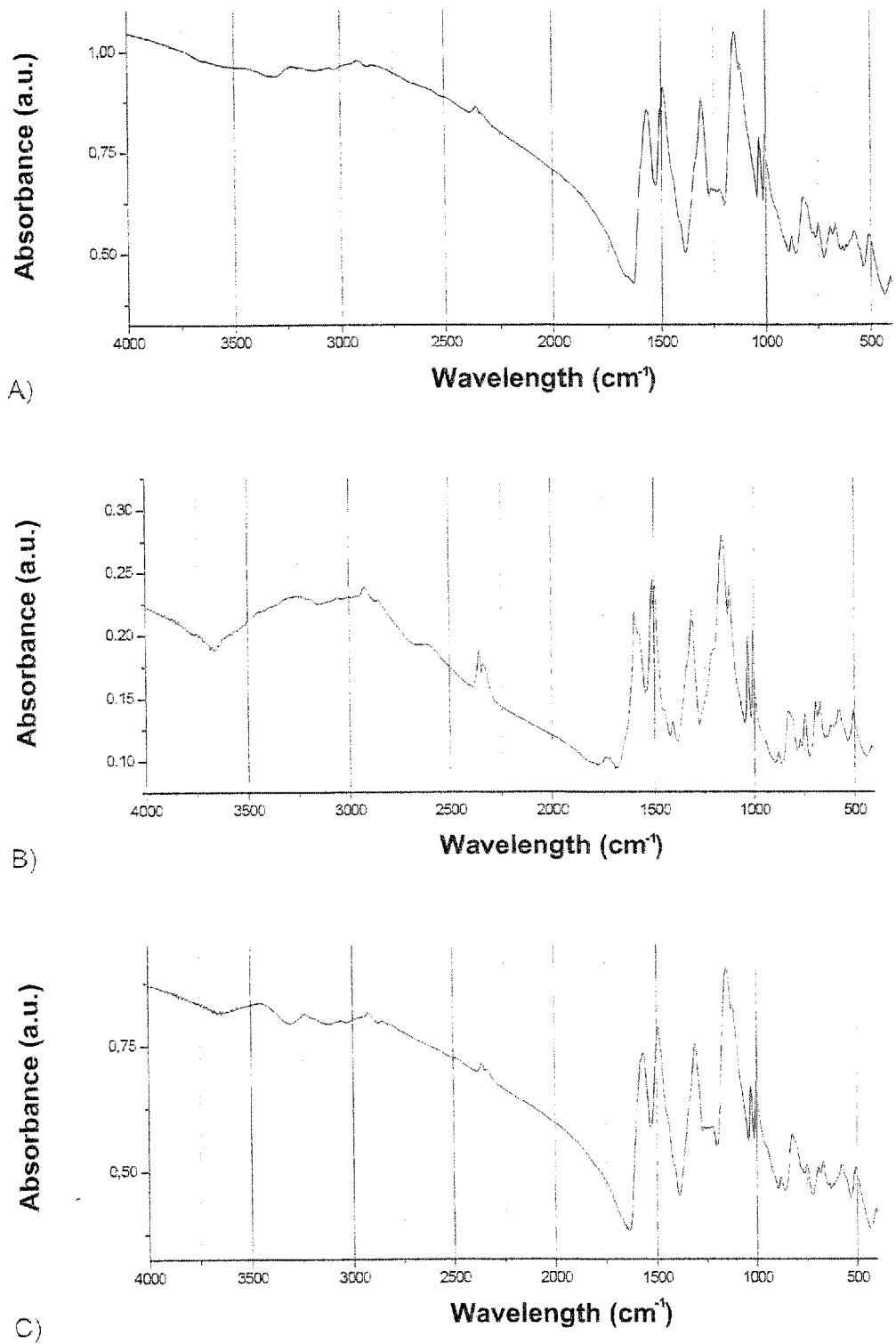
FIG. 8 illustrates a) the FT-IR spectrum for the PANI-PSS composite, b) the FT-IR spectrum for the PPG composite, c) the FT-IR spectrum for the CE-PPG composite.

The complete FT-IR spectra are shown in FIG. 8. The assignment of the peaks is shown in the following tables 1, 2 and 3.

TABLE 1

PANI PSS

| PSS Assignment | PANI Assignment | $cm^{-1}$ |
|---|---|---|
| ν $H_2O$ | | 3450 |
| | ν NH | 3227 |
| ν CH | ν CH | 3052 |
| ν CH | ν CH | 3025 |
| $ν_{as}$ $CH_2$ | | 2924 |
| $ν_s$ $CH_2$ | | 2850 |
| νArom | | 1600 |
| | ν quinoid ring | 1566 |
| νArom | | 1503 |
| | ν benzenoid ring | 1489 |
| νCN | | 1309 |
| $ν_{as}SO_3^-$ | | 1222 |
| | Absorption peak NdQdN* | 1150 |
| Vibration on plane of benzene ring | | 1120 |
| $ν_sSO_3^-$ | | 1030 |
| Bending vibration on plane of benzene ring | | 1004 |
| Bending outside the plane for the para-disubstituted benzene | | 823 |
| | Bending outside the plane of the quinone CH | 749 |
| ν C—S of the benzenoid ring | | 669 |

TABLE 2

PPG

| PSS Assignment | PANI Assignment | $cm^{-1}$ |
|---|---|---|
| ν $H_2O$ | | 3450 |
| | ν NH | 3305 |
| ν CH | ν CH | 3052 |
| ν CH | ν CH | 3025 |
| $ν_{as}$ $CH_2$ | | 2924 |
| $ν_s$ $CH_2$ | | 2850 |
| νArom | | 1600 |
| | ν quinone ring | 1568 |
| νArom | | 1502 |
| | ν benzenoid ring | 1488 |
| νCN | | 1309 |

TABLE 2-continued

PPG

| PSS Assignment | PANI Assignment | $cm^{-1}$ |
|---|---|---|
| $ν_{as}SO_3^-$ | | 1226 |
| | Absorption peak NdQdN* | 1151 |
| Bending vibration on plane of benzene ring | | 1122 |
| $ν_sSO_3^-$ | | 1031 |
| Bending vibration on plane of benzene ring | | 1004 |
| Bending outside the plane for the para-disubstituted benzene | | 824 |
| | Bending outside the plane of the quinone CH | 750 |
| ν C—S of the benzenoid ring | | 668 |

TABLE 3

PPG

| PSS Assignment | PANI Assignment | $cm^{-1}$ |
|---|---|---|
| ν $H_2O$ | | 3450 |
| | ν NH | 3250 |
| ν CH | ν CH | 3052 |
| ν CH | ν CH | 3025 |
| $ν_{as}$ $CH_2$ | | 2924 |
| $ν_s$ $CH_2$ | | 2850 |
| νArom | | 1599 |
| | ν quinone ring | 1571 |
| νArom | | 1502 |
| | ν benzenoid ring | 1494 |
| νCN | | 1313 |
| $ν_{as}SO_3^-$ | | 1209 |
| | Absorption peak NdQdN* | 1161 |
| Bending vibration on plane of benzene ring | | 1123 |
| $ν_sSO_3^-$ | | 1035 |
| Bending vibration on plane of benzene ring | | 1004 |
| Bending outside the plane for the para-disubstituted benzene | | 824 |
| | Bending outside the plane of the quinone CH | 748 |
| ν C—S of benzenoid ring | | 668 |

The FT-IR spectrum of the PPG composite is very similar to that of the PANI-PSS composite, since the main peaks of the PSS and the PANT are present.

The PSS shows the characteristic peaks of the polystyrene and of the sulfonic group. The area between 3100 and 3000 $cm^{-1}$ shows the vibration of the bonds between the hydrogen and the aromatic carbon, while the area between 3000-2800 $cm^{-1}$ shows the elongation of the bonds between hydrogen and carbon of the aliphatic chain[32]. The carbon-carbon stretching of the benzene ring[33] is present at 1600 and 1503 $cm^{-1}$. The peaks at 1120 and 1004 $cm^{-1}$ can be assigned to the vibration of the skeleton in the plane of the benzene ring and to the vibration outside the plane of the benzene ring[33]. The antisymmetric and symmetric vibrational absorption peaks of the $SO_3^-$ group can be assigned, respectively[33], to the peaks at 1222 and 1030 $cm^{-1}$. The characteristic band centred at 622 $cm^{-1}$ corresponds to the C—S elongation of the benzene ring[34,35]. The presence of PANI was confirmed by the peak at 3227 cm$^{-1}$ due to the elongation of the nitrogen hydrogen bond of the secondary aromatic amine[33] and by the carbon hydrogen elongation of the aromatic ring between 3100 and 3000 cm$^{-1}$.

In the regions of the aromatic rings, the PANI presents a band at 1566 cm$^{-1}$ attributed to the C=N stretching of the quinone diimino unit (the oxidised form of the PANI)[36]. The C—C stretching of the aromatic ring of the benzonoid diamine unit (the reduced form of PANI)[36] appears at 1489 cm$^{-1}$ and, lastly, the band at 746 cm$^{-1}$ is due to the band of the CH outside the plane of the quinone ring[33].

The FT-IR spectra of the PPG and CE-PPG samples are very similar to those of the PANI-PSS, thus confirming the formation of PANI also in the case of PPG samples.

Thermogravimetric Analyses

The thermogravimetric analyses (TGA) were conducted on 10 mg samples using a TG 209 F1 Libra® (NETZSCH GmbH) thermogravimetric analyser, heating speed 10° C. min$^{-1}$, from 25° C. to 800° C. under nitrogen flow (60 cm$^3$ min$^{-1}$). The thermal degradation temperatures reported refer to the maximum weight loss rate ($T_{max}$). The residual percentage by weight was evaluated at 800° C. The experimental error was estimated to be generally below 0.05 mg (approximately ±0.5%).

Figure 2:
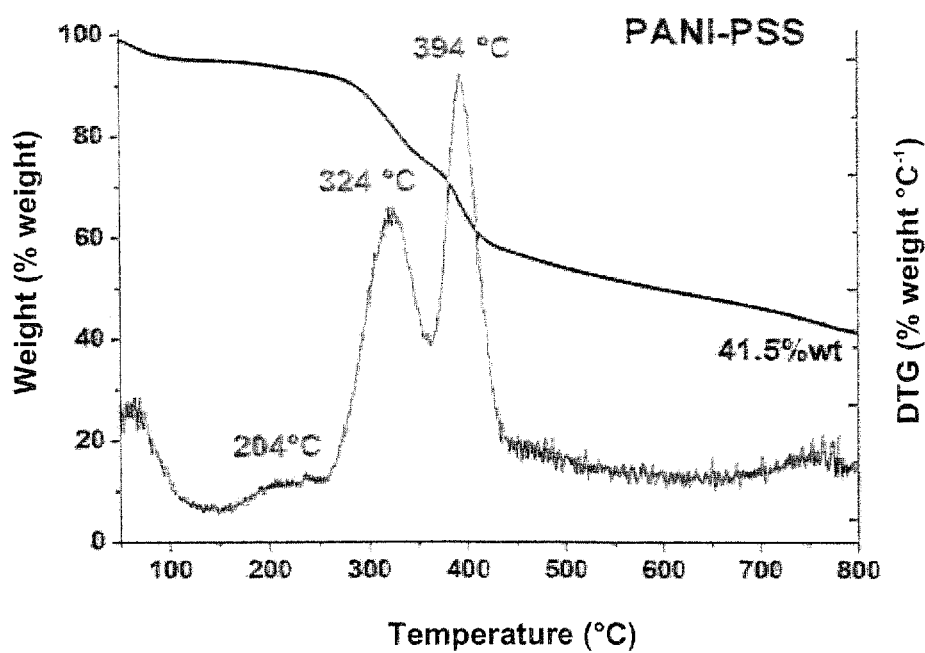
FIG. 2 illustrates the weight loss in thermal degradation (TGA) under nitrogen flow of the PANI-PSS composite.

As can be seen in FIG. 2, the PANI-PSS composite shows three main weight losses: the first at 204° C., resulting from evaporation of the humidity and degassing of small molecules (for example HCl) from the starting solution; the second and third peak, at 324° C. and 394° C. respectively, correspond to the thermal degradation of PANI.

Figure 3:
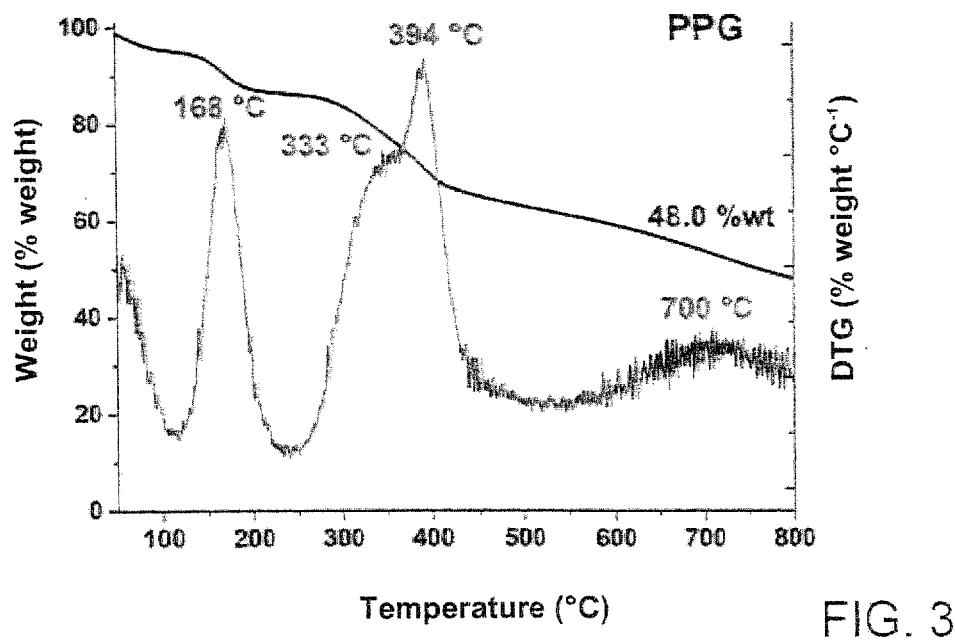
FIG. 3 illustrates the weight loss in thermal degradation (TGA) under nitrogen flow of the PPG composite.

For the PPG composite (FIG. 3), the complete absence of the peak at 220° C., due to the loss of oxygen, confirms the reduction of the initial GO (approximately 50% by weight) due to the interaction with DANI. The TGA curve of the weight loss is very similar to that of the PANI-PSS composite, showing a first weight loss below 200° C. due to degassing of small molecules. The second and third phases of the weight loss are in the same thermal interval as those observed for PANI-PSS, confirming that the polymerisation has taken place.

Figure 4:
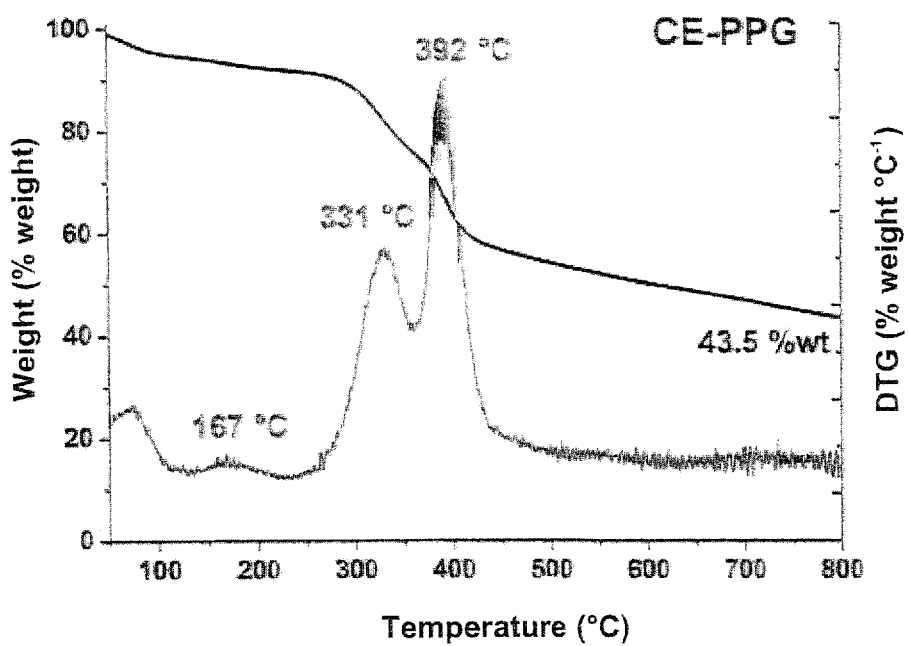
FIG. 4 illustrates the weight loss in thermal degradation (TGA) under nitrogen flow of the CE-PPG composite.

Lastly, the TGA of CE-PPG (FIG. 4) is substantially identical to that of the PANI-PSS. However, as scheduled, the final weight at 800° C. is lower than approximately 43.6% with respect to the initial weight as against 41.5% of the PANI-PSS composite, confirming the presence of the graphene, which is non volatile.

DC Characteristics

The synthesised materials as described in examples 1 and 2 were dispersed in DMSO to prepare the printable ink formulation. To increase the solubility of the inks, mechanical mixing and an ultrasound bath were used. The solutions are stable for 1-2 days prior to gelation. Therefore, just before printing, the solutions were treated in an ultrasound bath for one hour in order to re-disperse the ink, and then placed in a 3 ml tank and loaded in the inkjet printing system. The jet parameters fixed, using an asymmetric impulse, are the following: first rise time 12 µs, hold time 15 µs, fall time 5 µs, echo time 20 µs, second rise time 2 µs, waiting voltage 0 V, maintenance voltage 35 V, echo voltage −13 V.

Figure 5A:
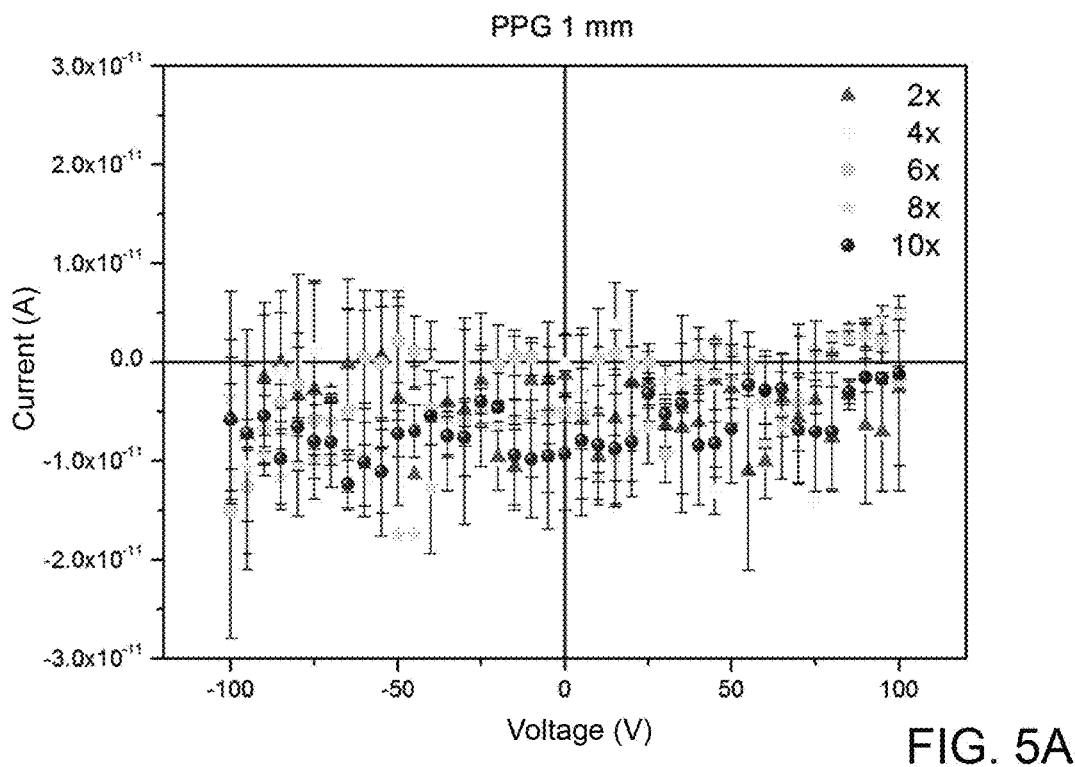
FIG. 5 illustrates a) the curve IV of a group of PPG samples printed by inkjet (width 1 mm, different number of overprints) which shows the insulating behaviour, b) the curve IV of a group of CE-PPG samples printed by inkjet (width 1 mm, different number of overprints) which shows the ohmic conduction behaviour, c) cyclic IV measurements (10 repetitions) of CE-PPG samples after subtraction of the linear ohmic contribution, d) cyclic IV measurements (10 repetitions) of CE-PPG samples which show the memristive behaviour with a small hysteresis.
Figure 5B:
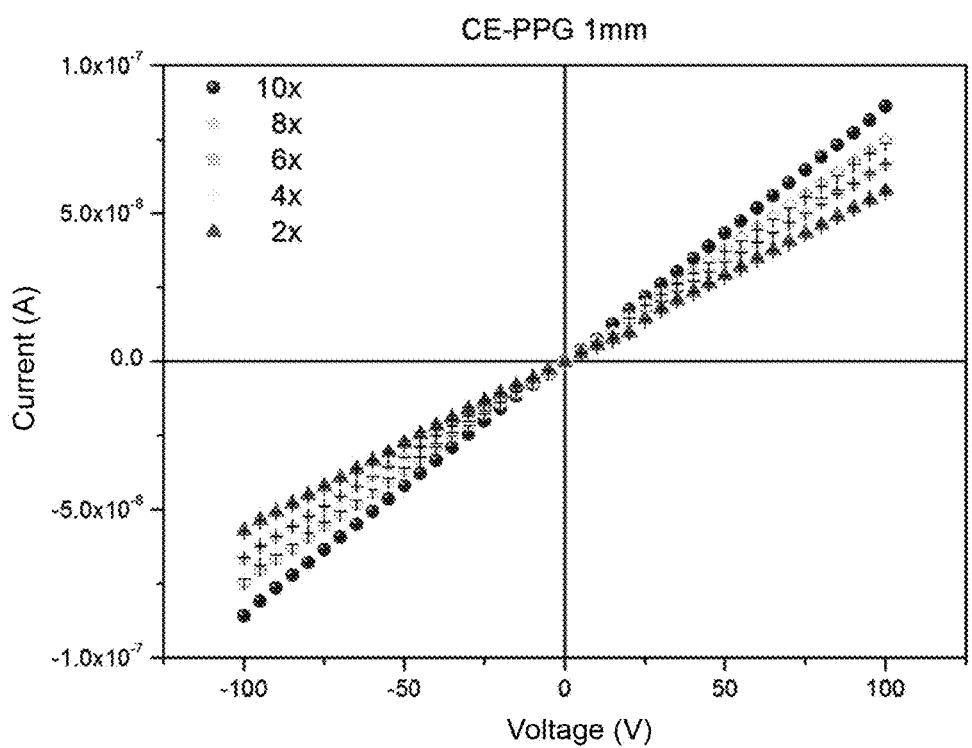
Figure 5C:
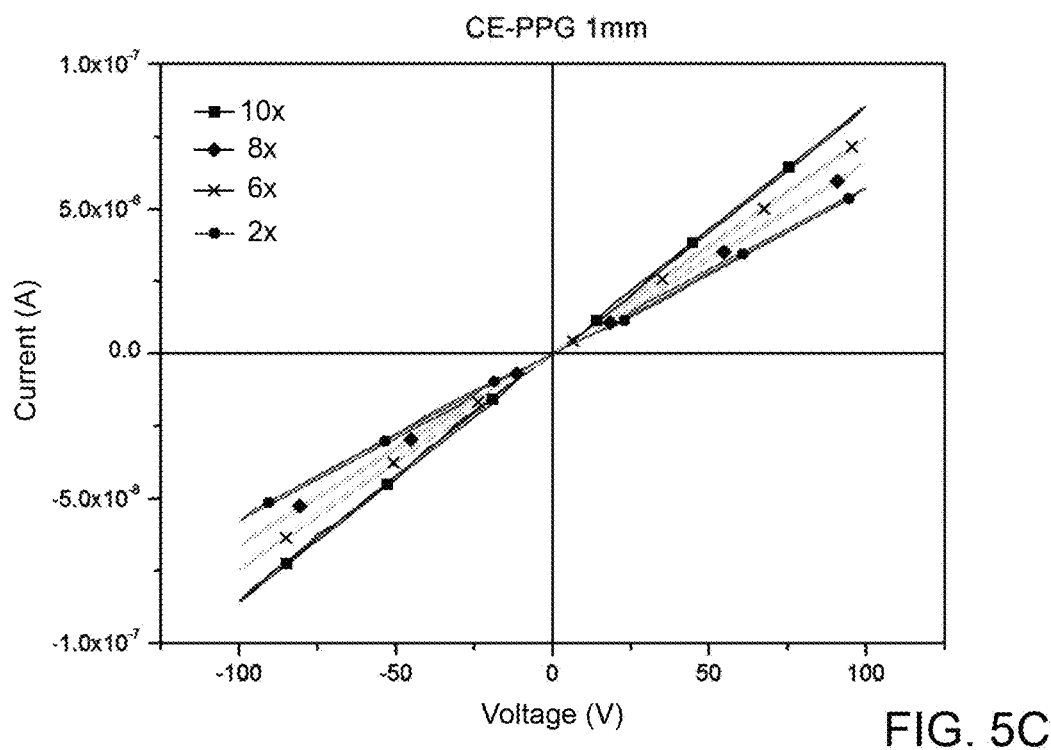

The analysis of the DC characteristics of the composites PPG and CE-PPG (FIG. 5) show that the percolation conduction paths are favoured in the CE-PPG samples, in which the PANI is present in a larger quantity than in the PPG samples, thus improving the conductance from an insulating behaviour of the PPG (FIG. 5*a*) to an ohmic dissipative behaviour of the CE-PPG (FIG. 5*b*).

The current that crosses the CE-PPG is five orders of magnitude greater than the one measured for the PPG, in the same potential interval applied. A confirmation of the reduction of the GO to graphene derives from the direct comparison with the pure PANI which has a conductivity three orders of magnitude greater than the CE-PPG. Another important characteristic is the extremely clear signal, as shown by the error bar in FIG. 5*b*.

Figure 5D:
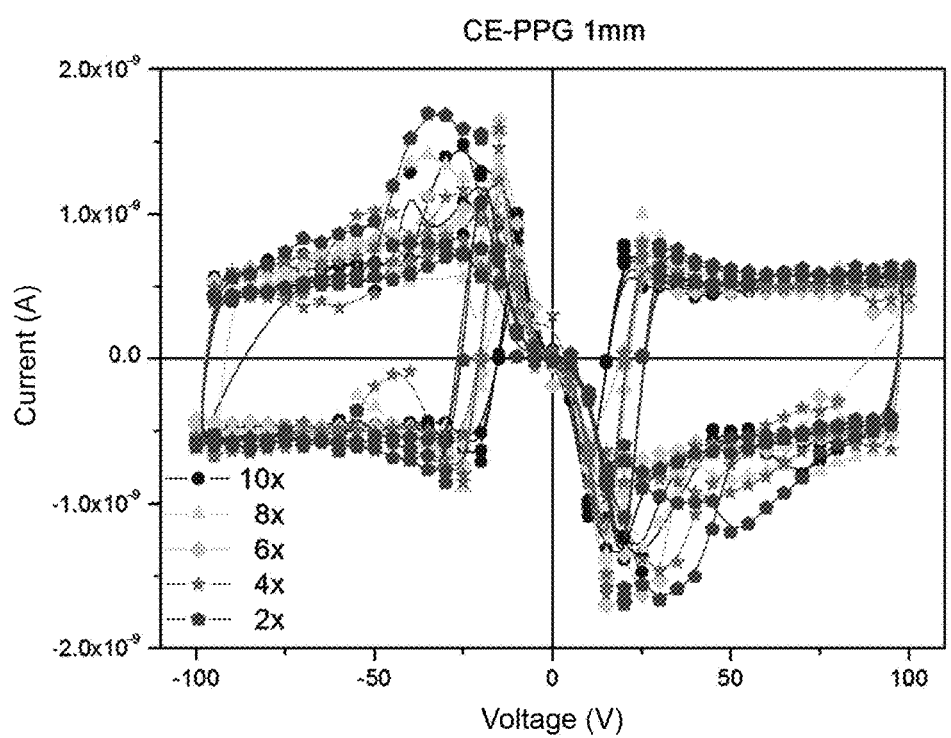

Furthermore, by cycling IV measurements, it is possible to exploit also the memristive properties[22] (FIG. 5*c*), whose characteristic "butterfly" diagram can be seen better after subtracting the linear ohmic contribution (FIG. 5*d*).

Figure 6A:
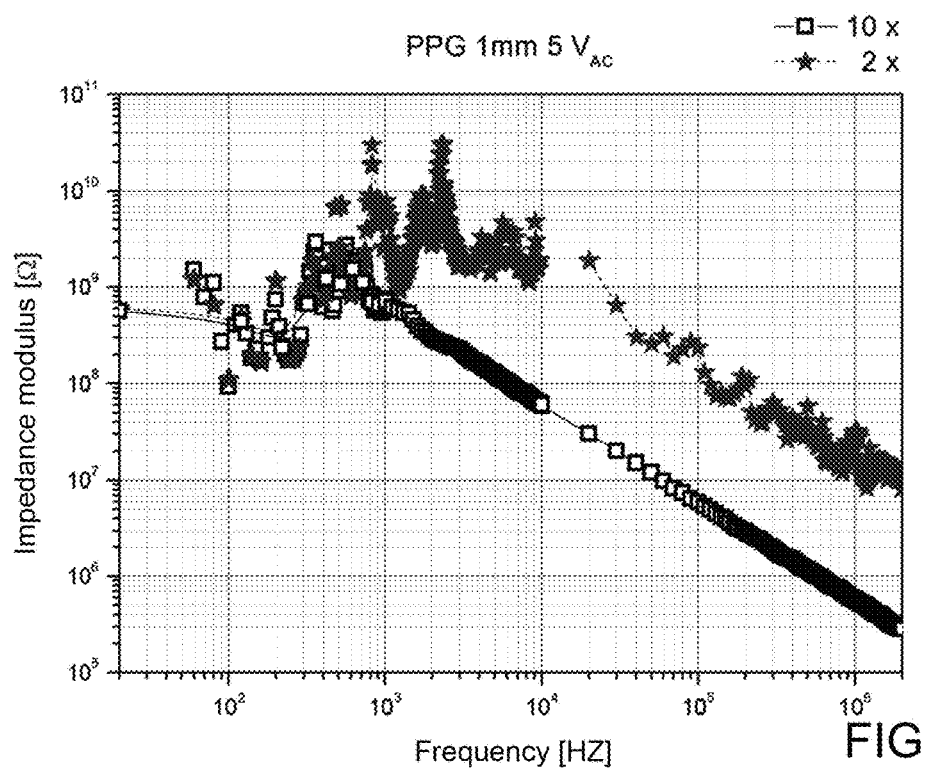
FIG. 6 illustrates a) the impedance modulus between 20 Hz and 2 MHz for a group of PPG samples printed by inkjet (width 1 mm, 2 and 10 overprints) subjected to sinusoidal excitation with amplitude of 10V, b) the impedance phase between 20 Hz and 2 MHz for a group of PPG samples printed by inkjet (width 1 mm, 2 and 10 overprints) subjected to sinusoidal excitation with amplitude of 10V, c) the Nyquist graph for a PPG sample printed by inkjet with 2 overprints (width 1 mm thickness) subjected to sinusoidal excitation with amplitude of 10V and cyclizing the DC contribution from −40 to +40V, d) the Nyquist graph for a PPG sample printed by inkjet with 10 overprints (1 mm width) subjected to sinusoidal excitation with amplitude of 10V and cyclizing the DC contribution from −40 to +40V, e,f) Comparison between the real part (e) and imaginary part (f) of the impedance for two CE-PPG devices printed with different number of overprints.
Figure 6B:
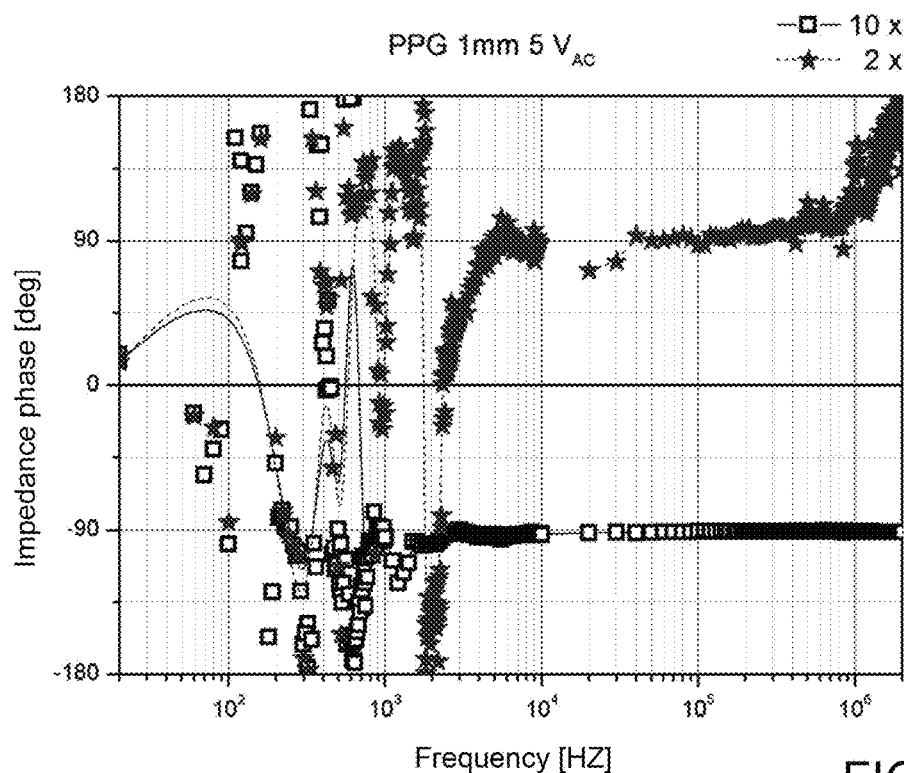
Figure 6C:
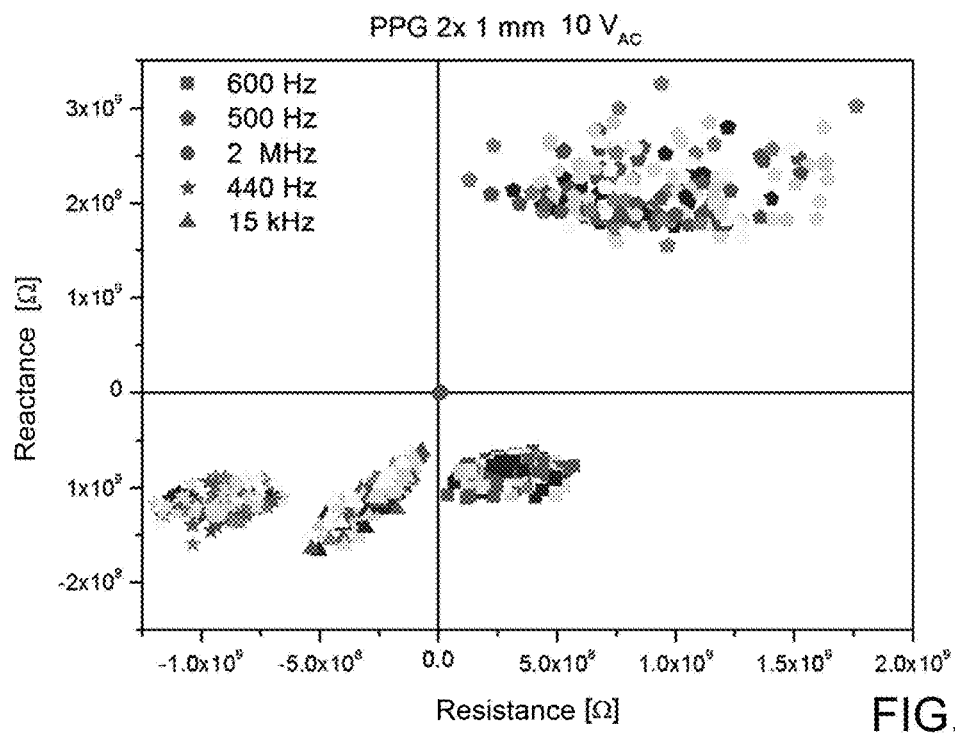
Figure 6D:
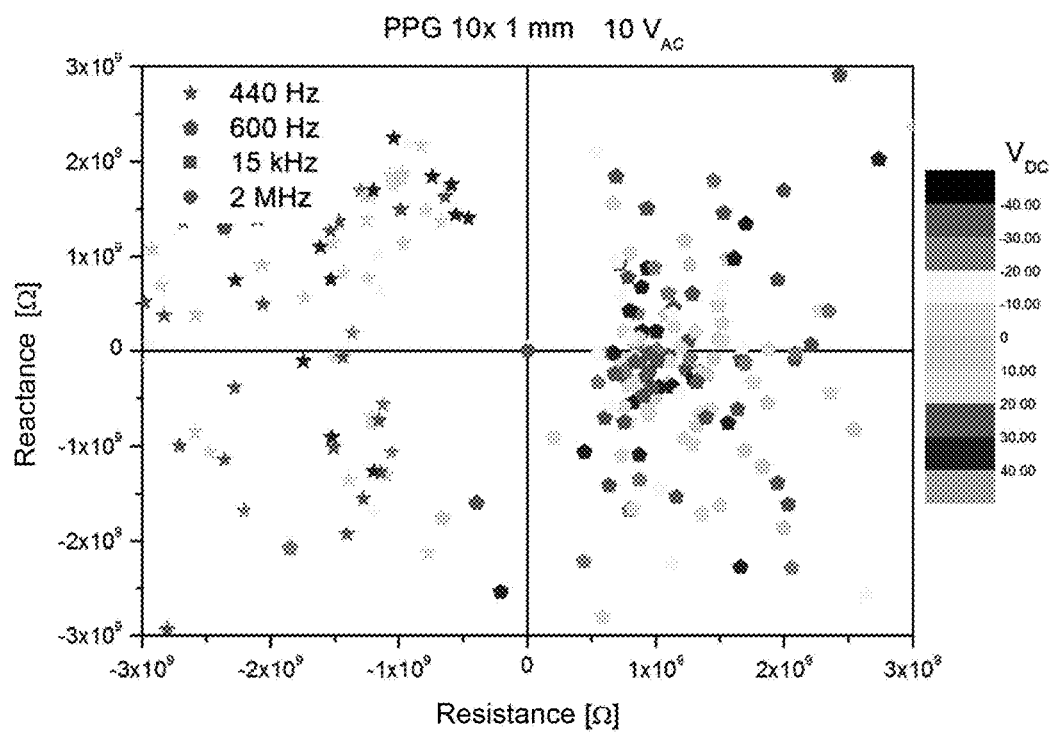
Figure 6E:
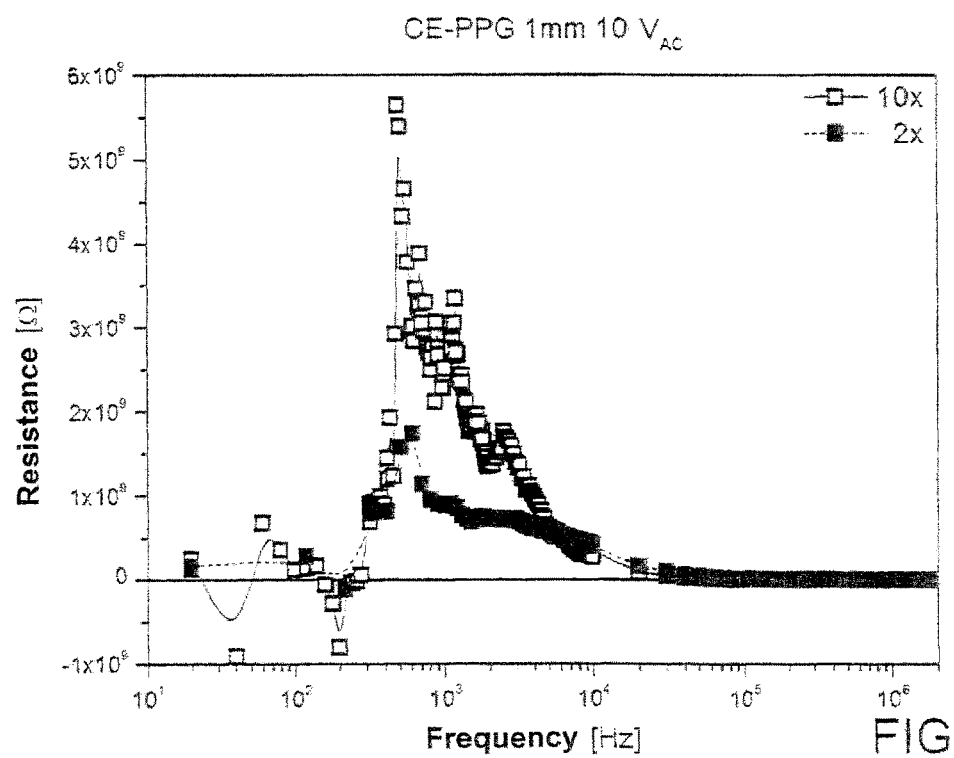
Figure 6F:
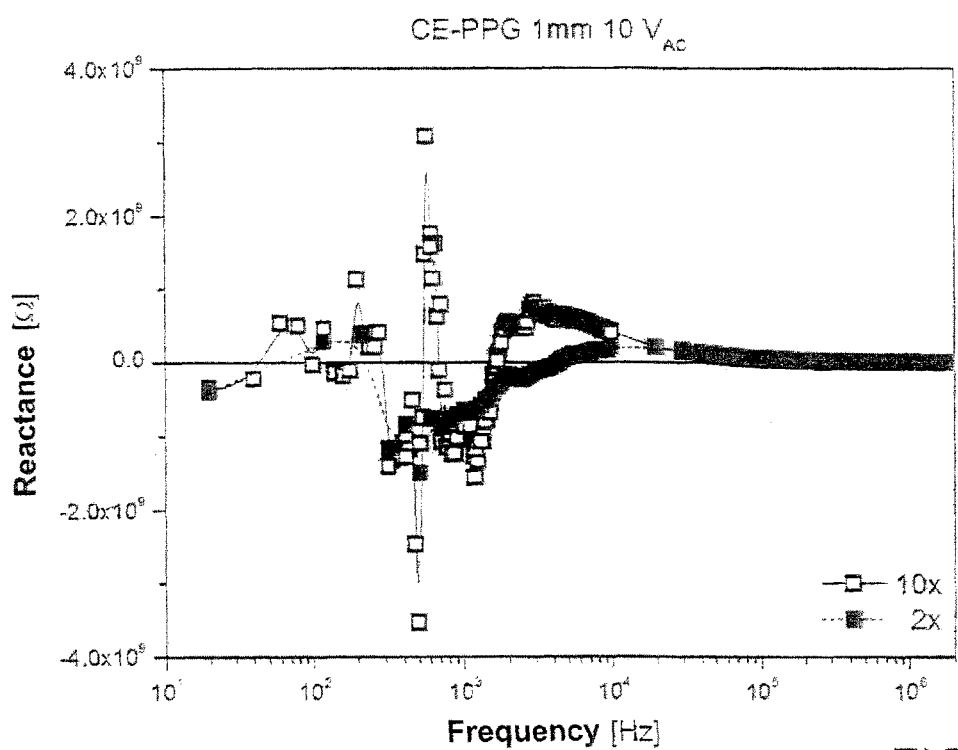

A particular behaviour can be observed by applying a combination of DC and AC stimuli. In particular, in FIG. 6, the evidence of a persistent negative capacity in the entire frequency range is proved for PPG printed with a low number of overprints: the phase is saturating at +90° from values below 10 kHz up to 1 MHz (FIGS. 6*a* and 6*b*). On the other hand, the PPG printed with a high number of overprints shows an impedance phase which grows statistically up to +90° only below 500 Hz, while at higher frequencies it behaves like an ohmic conductor. Seemingly, the impedance does not depend on the DC polarisation, as shown for the PPG samples (FIGS. 6*c* and 6*d*). The most promising results were obtained in samples with high conductivity (CE-PPG), in which the resistive and reactive parts of the impedance show a resonant diffusion, which occurs in the kHz regime and depends on the thickness of the sample (FIGS. 6*e* and 6*f*).

Figure 7A:
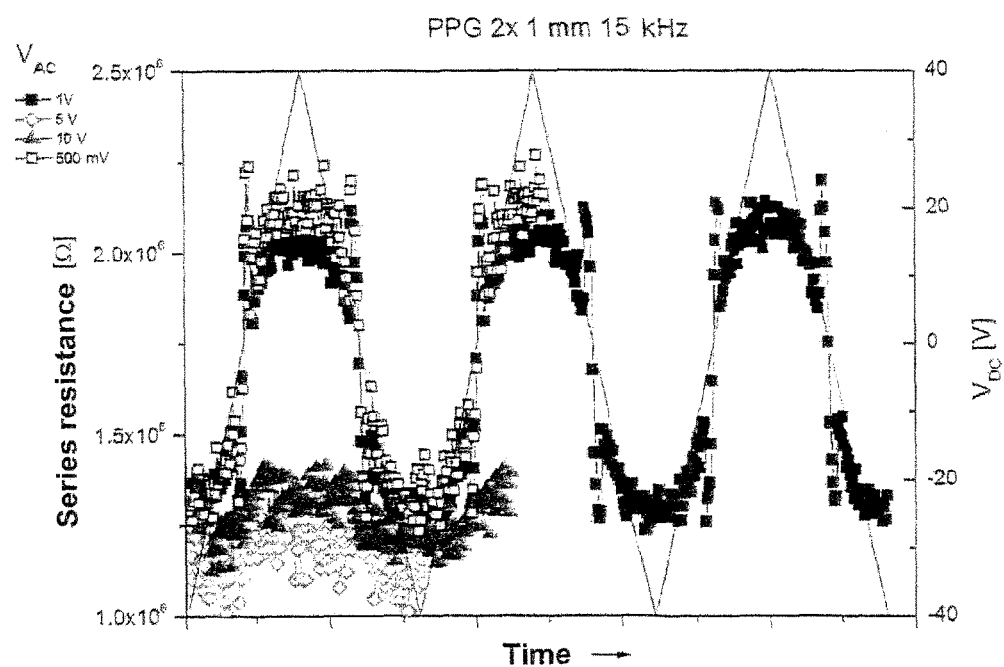
FIG. 7 illustrates a) series resistance in a device printed in 2 overprints of 1 mm of PPG subjected to a sinusoidal signal of 15 kHz with an overlapped voltage repeated cyclically between −40 and +40V, b) series capacity in a device printed in 2 overprints of 1 mm of PPG subjected to a sinusoidal signal of 15 kHz with an overlapped voltage repeated cyclically between −40 and +40V, c) modulation of the series resistance in a device printed in 2 overprints of 1 mm of PPG subjected to a sinusoidal signal of 15 kHz with an overlapped voltage repeated cyclically between −40 and +40V, d) series capacity on CE-PPG devices analysed in FIGS. 6e and 6f.
Figure 7B:
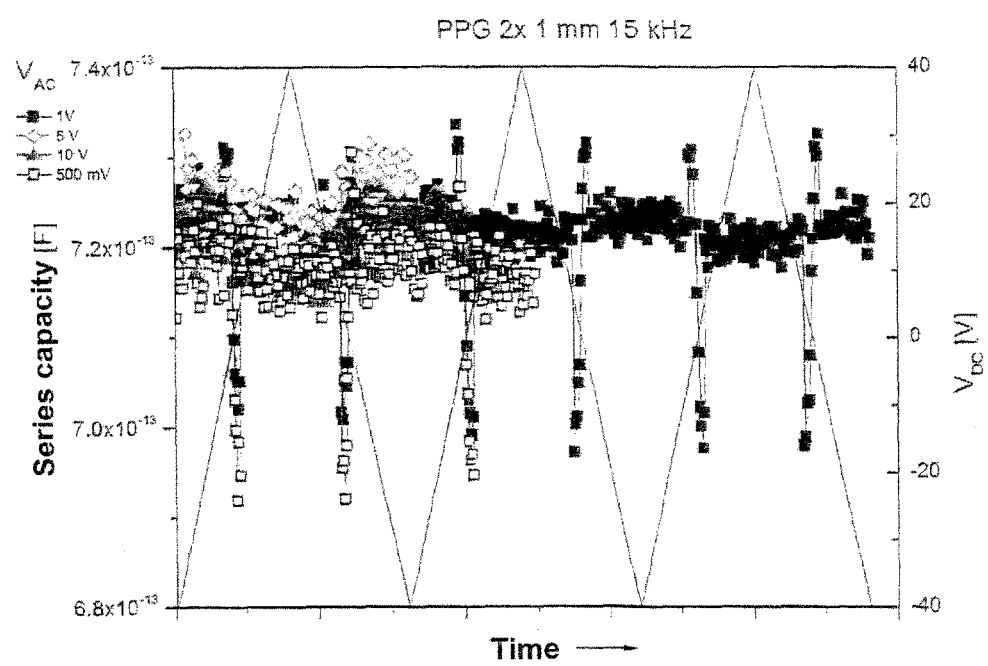
Figure 7C:
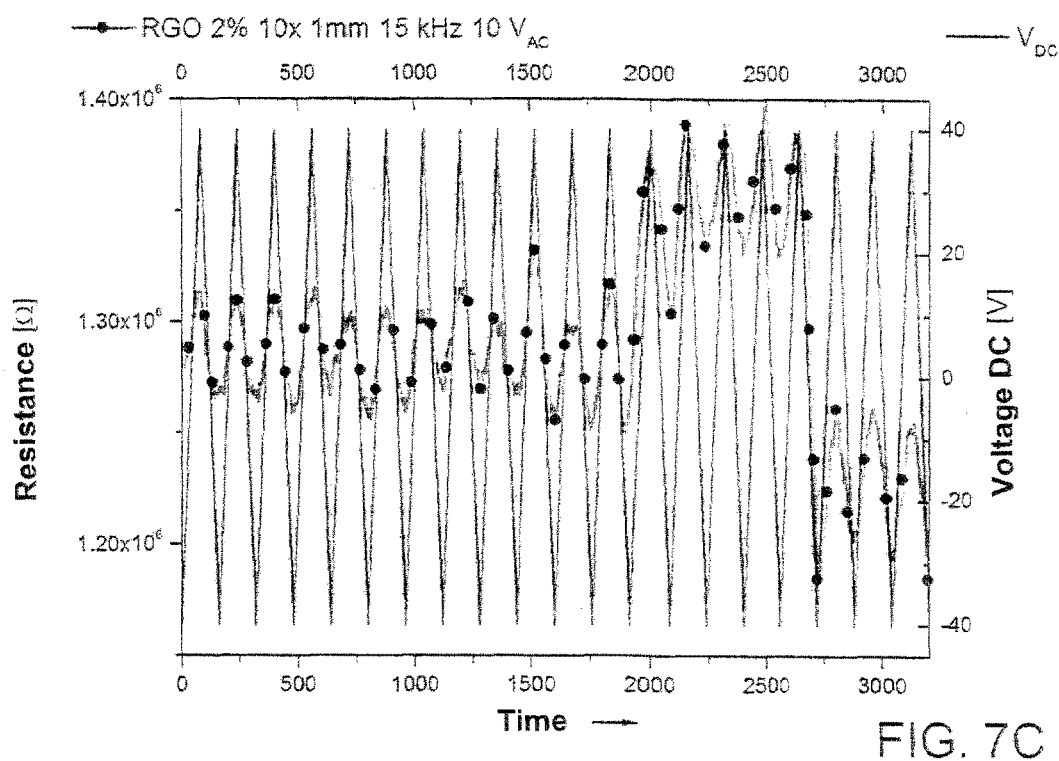
Figure 7D:
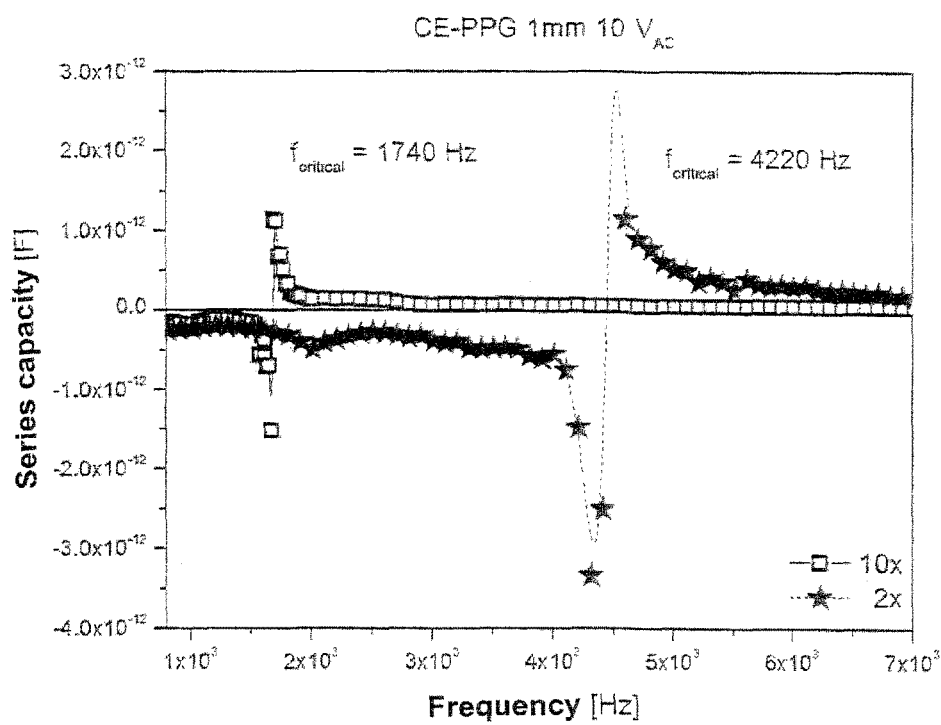

In some PPG samples this resonance produces a stable signal, which leads to perfectly voltage-controlled impedance variations which are visible both in the resistive component and in the reactive component of the impedance (FIGS. 7*a*, 7*b* and 7*c*). This property is extremely interesting because this material can be immediately used as a voltage-controlled phase shifter element.

Many experimental examples have been based on hierarchical structures consisting of graphene or other carbon-based nanomaterials in combination with the PANI for applications in supercapacitors[23,24,25], but so far a clear definition of the phenomena that occur at nanometric level has not been provided.

The impedance spectra are normally adapted to models that include ideal elements, like the Constant Phase Element[26] or other diffusion circuit elements, well known in electronics, such as the Warburg impedance element, which are used simply to improve the adaptability.

An attempt to describe the negative permittivity values in PANI/graphene nanocomposites was made in a recent study[27] which evokes the surface plasmonic resonance and the tunability of the graphene Fermi level voltage. Although the graphene can show a controlled voltage switching from the relativistic state of the Dirac fermion to a conventional state similar to metal[28], the plasmonic frequencies are generally much higher (10-100 THz) than the phenomena described in this patent (typical frequencies in the order of kHz)[22].

Therefore, the printed inkjet devices produced according to this example have practical applications in the electronics sector as adaptable supercapacitors, provided with positive or negative overcapacity according to the operating frequency. Considering the resistive component of the impedance, the enormous contribution found in the CE-PPG sample in the interval between 500 Hz and 5 kHz (particularly evident for the sample printed with high number of overprints, FIG. 6*e*) can be explained by a resonance scattering, once again, in which the quanto-relativistic nature of the graphene is such that the scattering potentials make a non-negligible contribution to the resistivity[15].

A system has therefore been described in which the quanto-relativistic properties of the graphene emerge, inducing a transfer of resonant energy between Dirac fermions and small scattering centres adjacent to the PANI chains. These events show the occurrence of extremely interesting physical phenomena, so far never reported in one single material, such as negative capacity at high frequency (MHz), voltage-controlled phase shift and negative/positive diverging capacities at the characteristic resonance frequency (kHz). These properties can be exploited in advanced electronic devices, taking advantage of the possibility of use in solution and direct inkjet printing.

REFERENCES

1. Unsworth, J., Lunn, B. A., Innis, P. C., Jin, Z., Kaynak, A., Booth, N. G. J. Intell. Mater. Syst. Str. 3, 380-395 (1992).
2. Schoch, K. F. IEEE Electr. Insul. Mag. 10, 29-32 (1994); Angelopoulos, M. IBM J. Res. Develop., 45, 57-75 (2001); Gospodinova, N., Terlemezyan, L. Prog. Polym. Sci. 23, 1443-1484 (1998).
3. Gospodinova, N., Terlemezyan, L. Prog. Polym. Sci. 23, 1443-1484 (1998).
4. Bhadra, S., Dipak, K., Singha, N. K., Lee, J. Prog. Polym. Sci. 34, 783-810 (2009).
5. Bocchini, S., Chiolerio, A., Porro, S. et al. J. Mater. Chem. C 1, 5101-5109 (2013).
6. MacDiarmid, A. G. Angew. Chem. Int. Ed. 40, 2581-2590 (2001).
7. Kang, E., Neoh, K. G., Tan, K. L. Prog. Polym. Sci. 23, 277-324 (1998).
8. Chiolerio, A., Bocchini, S. and Porro, S. Adv. Funct. Mater. 24, 3375-3383 (2014).
9. Di Ventra, M., Pershin, Y. V., Chua, L. O., arKiv: 0901.3682v1
10. Berzina, T. S., Gorshkov, K. V., Erokhin, V. V., Nevolin, V. K., Chaplygin, Y. A. Russian Microelectronics 42, 27-32 (2013).
11. Lu, W. Nature Mater. 12, 93-94 (2013).
12. Pickett, M. D., Medeiros-Ribeiro, G. & Williams, R. S. Nature Mater. 12, 114-117 (2013).
13. Novoselov, K., Geim, A., Morozov, S., Jiang, D., Zhang, Y., Dubonos, S., Grigorieva, I., Firsov, A. Science 306, 666-669 (2004).
14. Geim, A. K., Novoselov, K. S. Nat. Mater. 6, 183-191 (2007).
15. Katsnelson, M. I., Novoselov, K. S., Solid State Commun 143, 3-13 (2007).
16. Rourke, J. P., Pandey, P. A., Moore, J. J., Bates, M., Kinloch, I. A., Young, R. J., Wilson, N. R. Angew. Chem. Int. Ed. 50, 3173-3177 (2011)
17. Boehm H P, Clauss A, Fischer G, Hofmann U. Fifth Conference on Carbon, Pergamon Press, Oxford 1962, p. 73.
18. Xu L Q, Liu Y L, Neoh K G, Kang E T, Fu G D. Macromol. Rapid Comm. 2011; 32(8): 684-8.
19. Shim, Y. B., Park, S. M. Electrochemistry of conductive polymers VII. Autocatalytic rate constant for polyaniline growth. Synth. Met. 29/1, 169-174 (1989).
20. Bocchini, S., Chiolerio, A., Porro, S. Metodo per la preparazione di compositi di polianilina e ossido di grafene ridotto. Italian Patent Application n. TO2013A000561, 4 Jul. 2013.
21. Xia, Y., Wiesinger, J. M., MacDiarmid, A. G., Epstein, A. J. Camphorsulfonic acid fully doped polyaniline emeraldine salt: conformations in different solvents studied by an ultraviolet/visible/near-infrared spectroscopic method. Chem. Mater. 7, 443-445 (1995).
22. Pershin, Y. V., Di Ventra, M. Memory effects in complex materials and nanoscale systems. Adv. in Phys. 60, 145-227 (2011).
23. Meng, Y., Wang, K., Zhang, Y., Wei, Z. Hierarchical porous graphene/polyaniline composite film with superior rate performance for flexible supercapacitors. Adv. Mater. 25, 6985-6990 (2013).
24. Plonska-Brzezinska, M. E., Breczko, J., Palys, B., Echegoyen, L. The electrochemical properties of nanocomposite films obtained by chemical in situ polymerization of aniline and carbon nanostructures. Chem. Phys. Chem. 14, 116-124 (2013).
25. Lee, T. et al. Hybrid multilayer thin film supercapacitor of graphene nanosheets with polyaniline: importance of establishing intimate electronic contact through nanoscale blending. J. Mater. Chem. 22, 21092-21099 (2012).
26. Kochowski, S., Nitsch, K. Description of the frequency behaviour of metal-SiO2-GaAs structure characteristics by electrical equivalent circuit with constant phase element. Thin Solid Films 415, 133-137 (2002).
27. Zhu, J. et al. Carbon nanostructure-derived polyaniline metacomposites: electrical, dielectric, and giant magnetoresistive properties. Langmuir 28, 10246-10255 (2012).
28. Hill, A., Mikhailov, S., Ziegler, K. Dielectric function and plasmons in graphene. Europhys. Lett. 87, 27005 (2009).
29. Monguzzi, A., Tubino, R. Meinardi, Upconversion-induced delayed fluorescence in multicomponent organic systems: role of Dexter energy transfer. F. Phys. Rev. B 77, 155122 (2008).
30. Chen, H. C. et al. White-light emission from an upconverted emission with an organic triplet sensitizer. Chem. Comm. 27, 4064-4066 (2009).
31. Reineke, S. et al. White organic light-emitting diodes with fluorescent tube efficiency. Nature 459, 234-238 (2009).
32. Mayo, D. W., Miller, F. A., Hannah, R. W. Course notes on the interpretation of infrared and Raman spectra (Hoboken, John Wiley & Sons, NJ, USA, 2004).
33. Silverstein, R. M., Webster, F. X. Spectrometric identification of organic compounds 6th ed Ch. 3 (John Wiley and Sons, New York, 1998).
34. Jamróz, D., Maréchal, Y. Hydration of sulfonated polyimide membranes. II. Water uptake and hydration mechanisms of protonated homopolymer and block copolymers. *J. Phys. Chem. B* 109, 19664-19675 (2005).
35. Lee, H. Y., Rwei, S. P., Wang, L., Chen, P. H. Preparation and characterization of core-shell polyaniline-polystyrene sulfonate@$Fe_3O_4$ nanoparticles. *Mater. Chem. Phys.* 112, 805-809 (2008).
36. Tang, J., Jing, X., Wang, B., Wang, F. Infrared spectra of soluble polyaniline. *Synt. Met.* 24, 231-238 (1988).

The invention claimed is:
1. A method for obtaining polyaniline/reduced graphene oxide composites comprising:
   dispersing the graphene oxide in an acid aqueous solution containing an emulsifying agent to obtain a graphene oxide dispersion;
   dissolving one or more aniline oligomers in an organic solvent to obtain an oligomer solution;
   mixing the oligomer solution with the graphene oxide dispersion, said oligomer being added in a stoichiometric excess compared to the quantity required to complete the graphene oxide reduction;

adding to the suspension of the aniline/reduced graphene oxide composite an oxidizing agent in a stoichiometric quantity compared to said excess of oligomer to oxidize the excess of said oligomer to obtain a suspension of the polyaniline/reduced graphene oxide composite.

2. The method according to claim 1, wherein said oligomer is an aniline dimer.

3. The method according to claim 1, wherein said oligomer is optionally substituted in one of the ortho and meta positions to the nitrogen atom or on the nitrogen atom itself with a radical selected from the group consisting of methoxyl, ethoxyl, propyloxyl, methyl, ethyl, propyl, isopropyl, butyl, isobutyl, tertbutyl, pentyl, phenyl, sulfonyl, and vinyl.

4. The method according to claim 1, wherein said emulsifying agent is selected from the group consisting of poly(styrene sulfonate), dodecylbenzenesulfonate, methylbenzenesulfonate (MBSA), 2-aminoethylphosphonate, polyacrylate, adipate, poly(2-acrylamido-3-methyl-1-propane sulfonate), dodecyldiphenyl oxide disulfonate, N,N'-dimethyl(methacryloylethyl)ammonium propane sulfonate, 2-acrylamido-2-methyl-1-propane sulfonate, and isophthalic 5-sulfonate.

5. The method according to claim 1, wherein said organic solvent is selected from the group consisting of 1,2-butanediol, 1,3-butanediol, 1,3-propanediol, 1,4-butanediol, 1,4-dioxane, 1,5-pentanediol, 1-propanol, 2-butoxyethanol, 2-propanol, acetaldehyde, acetic acid, acetone, acetonitrile, butyric acid, diethanolamine, diethylenetriamine, dimethoxyethane, dimethylsulfoxide, N,N-dimethylformamide, ethanol, ethylamine, ethylene glycol, formic acid, furfuryl acid, glycerol, methanol, methyldiethanolamine, methyl isocyanide, propanoic acid, propylene glycol, pyridine, tetrahydrofuran, triethylene glycol, N-methylpirrolidone, and N,N-dimethylacetamide.

6. The method according to claim 1, characterized in that said oxidizing agent is selected from the group consisting of ammonium persulfate, $Cu^{2+}$, $Cu^+$, $Fe^{3+}$, $Pd^{2+}$, $MnO_4^-$, $Sb^{+5}$, $Ag^+$, $Au^{3+}$, $Au^+$, $Pt^{2+}$, $Cr_2O_7^{2-}$, $Rh^{4+}$, $Ce^{4+}$, $Mn^{3+}$, $Co^{3+}$, $CrO_4^{2-}$, $S_2O_4^{-2}$ salts, hydrogen peroxide, and gaseous oxygen.

7. The method according to claim 6, wherein said oxidant is ammonium persulfate.

8. The method according to claim 1, further comprising a heating step after said step of mixing said oligomer solution with said graphene oxide dispersion.

9. The method according to claim 8, wherein said heating is carried out over a temperature interval between 40 and 90° C.

10. The method according to claim 8, wherein said heating is carried out for a time interval between 20 minutes and 6 hours.

11. The method according to claim 1, wherein said aqueous acid solution is an aqueous solution of an acid selected from the group consisting of hydrochloric, nitric, sulfuric and phosphoric acid.

\* \* \* \* \*